Figure 1:
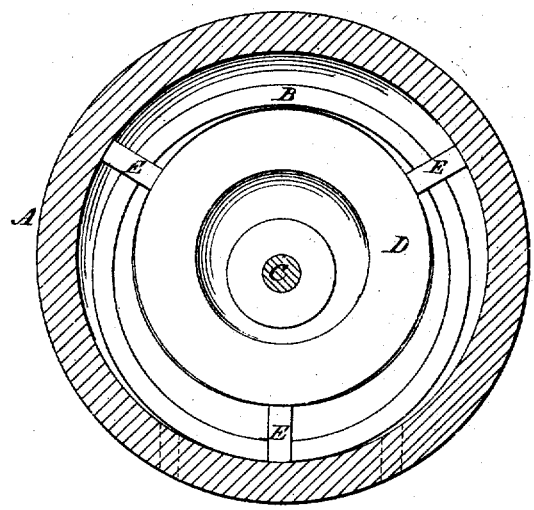
Figure 2:
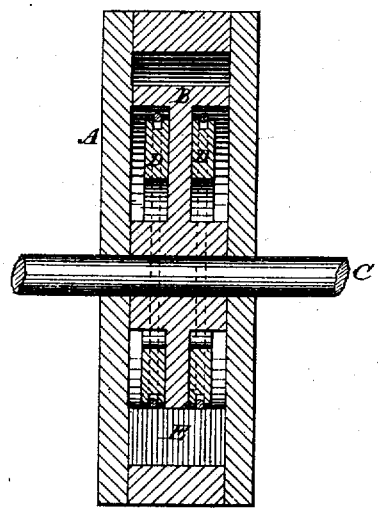

JOSEPH B. BENNETT.

Improvement in Rotary Steam Engines.

No. 4,808. Reissued March 19, 1872.

*Witnesses:*

E. S. Bennett

William J. Boz

*Inventor.*

Joseph B. Bennett.

UNITED STATES PATENT OFFICE.

JOSEPH B. BENNETT, OF BROOKLYN, NEW YORK.

IMPROVEMENT IN ROTARY STEAM-ENGINES.

Specification forming part of Letters Patent No. 74,744, dated February 25, 1868; reissue No. 4,808, dated March 19, 1872.

Specification describing certain Improvements in Combined Rotary Engines and Pumps, invented by JOSEPH B. BENNETT, of Brooklyn, in the county of Kings and State of New York. I do hereby declare that the following is a full, clear, and exact description thereof, reference being had to the accompanying drawing and to the letters of reference marked thereon.

In the annexed drawing making part of this specification, A represents a cylinder, which is provided with two steam-tight heads. Within the cylinder A is placed the wheel B, which is provided with a rim, which is made as deep as the cylinder is wide between its heads. This wheel B is provided with a hub at its center, and through this hub passes a shaft, C. Between the hub and the rim of the wheel is an annular cavity on each face of the wheel, and within these cavities are placed the rim-wheels or loose rings D D—one in each cavity. The wheel B is less in diameter than the inner diameter of the cylinder A, and is placed eccentrically in said cylinder, so that when in position its periphery lightly touches the inner periphery of the cylinder. The shaft of wheel B has its bearing in suitable openings in the heads of cylinder A. The wheel B has three equidistant openings cut through its rim from one side to the other, and in these openings three pistons, E E E, are placed. The pistons are just long enough to reach from the inner periphery of the cylinder to the peripheries of the rim-wheels D, so that the wheels or rings D are always concentric with the cylinder A. A metallic spring is placed around the periphery of the rings D D, and these springs fit snugly against the inner ends of the pistons. The object of the rim-wheels or rings D is to keep the pistons in their proper places, while the inner periphery of cylinder A forces them in, and the object of the springs around the wheels D is to take up any slack in the pistons and keep them snugly in position. The periphery of the cylinder A has through it two steam-openings, H H, one for receiving and the other for discharging steam.

It will readily be seen that the rim-wheels D, although they revolve, can never change position in relation to the inner periphery of the cylinder, as it is permanently separated from said inner periphery just the length of the pistons.

Having thus described my invention, what I claim, and desire to secure, is—

1. The combinations of the loose rings D D with pistons E in a rotary engine, the inner wheel B of which is eccentric to the outer cylinder A, substantially as shown.

2. The springs around the wheels D, in combination with pistons E in an engine, the cylinder A and wheel B of which are eccentric to each other, substantially as specified.

JOSEPH B. BENNETT.

Witnesses:
E. L. BENNETT,
WILLIAM J. BOK.